United States Patent [19]
Eremin et al.

[11] Patent Number: 5,689,295
[45] Date of Patent: Nov. 18, 1997

[54] MULTICOLOR INK JET PRINTING METHOD, PRINT HEAD HAVING PARTICULAR ORIFICE ARRANGEMENT, AND HEAD MANUFACTURE METHOD INCLUDING REMOVAL AND ASSEMBLY OF LAYERS

[75] Inventors: Jury Grigorievich Eremin; Sergei Nikolaevich Maximovsky; Grigory Avramovich Radutsky, all of Moscow, Russian Federation

[73] Assignee: Samsung Electronics Co., Ltd., Seoul, Rep. of Korea

[21] Appl. No.: 847,983

[22] PCT Filed: May 30, 1991

[86] PCT No.: PCT/SU91/00107

§ 371 Date: Apr. 13, 1992

§ 102(e) Date: Apr. 13, 1992

[87] PCT Pub. No.: WO91/19956

PCT Pub. Date: Dec. 26, 1991

[30] Foreign Application Priority Data

Jun. 12, 1990 [SU] U.S.S.R. ................ 4829820

[51] Int. Cl.⁶ .............. B41J 2/21; B41J 2/015; B41J 2/06
[52] U.S. Cl. ............. 347/43; 347/20; 347/55; 29/890.1
[58] Field of Search ............ 346/140 R, 1.1; 29/890.1; 347/20, 40, 42, 43, 55, 71

[56] References Cited

U.S. PATENT DOCUMENTS

| | | | |
|---|---|---|---|
| 4,280,130 | 7/1981 | Slemmons | 347/75 |
| 4,347,522 | 8/1982 | Bahl et al. | 347/76 |
| 4,354,197 | 10/1982 | Reitberger | 347/55 |
| 4,511,907 | 4/1985 | Fukuchi | 347/12 |
| 4,516,139 | 5/1985 | Takiguchi | 347/15 |
| 4,528,575 | 7/1985 | Matsuda et al. | 347/41 |
| 4,580,148 | 4/1986 | Domoto et al. | 347/42 X |
| 4,689,694 | 8/1987 | Yoshida | 358/298 |

FOREIGN PATENT DOCUMENTS

| | | | |
|---|---|---|---|
| 61-255861 | 11/1986 | Japan | 347/43 |
| 1635896 | 3/1991 | U.S.S.R. | |

OTHER PUBLICATIONS

Nagorny V.S. "Elektrokaplestruinye registrirujuschie ustroistva" 1988, Mashinostroenie (Leingrad), pp. 243–250.

*Primary Examiner*—David Yockey
*Attorney, Agent, or Firm*—Keck, Mahin & Cate

[57] ABSTRACT

A printing method is performed with an ink jet print head including a matrix of groups of orifices positioned in parallel rows. Each group has a plurality of orifices which each eject fluid of a different color. The color fluid, e.g. ink, is simultaneously propelled through the orifices of each group selected for printing and onto an information carrier which is stationary in relation to the matrix. The print head has a multilaminate structure with additional layers (20–25) of an underlay (10) equal to the number of print colors. The orifices (BK, Y, R, B) are divided into groups of adjoining orifices with the same number of orifices in each group and with the orifices in each group disposed in a square arrangement. The inlet openings of all orifices which eject fluid of the same color are placed in a single additional layer of the underlay. Feeder channels (26–29) are made in each additional layer of the underlay and cross the orifice openings (11–14) in that layer. In forming the head, orifices for one color are formed by cutting capillary openings though the layers of the head, removing an outer layer, and repeating these steps for remaining colors, followed by reassembling the layers in a reverse order.

4 Claims, 4 Drawing Sheets

MULTICOLOR INK JET PRINTING METHOD, PRINT HEAD HAVING PARTICULAR ORIFICE ARRANGEMENT, AND HEAD MANUFACTURE METHOD INCLUDING REMOVAL AND ASSEMBLY OF LAYERS

FIELD OF TECHNOLOGY

The invention relates to methods of multicolor jet printing, jet print heads, and modes of their manufacture.

BACKGROUND OF THE INVENTION

Among the recognized methods of multicolor jet printing, optimal quality is secured by that which position an information carrier opposite a group array of ink jet orifices made according to the number of print colors, and forms image (record) elements on the information carrier in the manner of subtraction of colors by propelling ink onto the information carrier through a group orifices selected for printing, onto the zone of every image element (V. S. Nagorni, "Elektrokaplestruinije registrirujuschie ustroistva", 1988, Mashinostrojenije, Leningrad, pp.243–250).

This method is inadequate as the quality of the image obtained largely depends on exactness of respective displacement of the information carrier and ink orifices. Besides, the quality of the image is affected by such external factors as environmental temperature fluctuations and deformation of the carrying frame of the print device on which the orifices and gears for displacement of the information carrier and/or of the orifices et al. are housed. Due to these factors, respective displacement of the orifices and the information carrier goes out of control. Further, the quality of the image rests on precision of manufacture, on movements of the print device elements, and on dimensional changes in gears due to wear and tear.

To perform such a method of multicolor jet printing, different devices are used, e.g., the method described in U.S. Pat. Nos. 4,511,907 and 4,516,139. In these systems, each head is meant for a particular print color, and it commands parallel rows of orifices of the same name. The printing quality (exactness of color adjustment) achieved by the heads depends on manufacturing precision, accurateness of movement and/or displacement synchronization of orifices and/or of the information carrier. This makes the structure of the print device very complex, and causes unstable quality of multicolor printing due to such external factors as voltage oscillation, temperature change and impact of deformations, vibration, etc.

Recognized also is the jet print head comprising a multilaminate structure, an underlay, criss-crossing parallel rows of orifices made by capillary openings (tubes) directed perpendicular to the plane of the underlay, each opening having an electrode that is common for the given row of orifices, and with an individual electrode of opposite polarity positioned on the same plane as of the common electrode. Placed in separate layers of the multilaminate structure is the system of the electric current supply to the electrodes and also the system of ink supply containing feeder channels through which communication is established with inlet orifices (EPA 90900407.9).

This print head is inadequate because it does not provide for simultaneous supply of ink to the adjacent orifices of the head.

The above jet print head is obtained by creating on the underlay the multilaminate structure formed of dielectric layers with the common and individual electrodes, and containing a switch-on-current system for the common and individual electrodes. Organized next are the orifices: in the form of capillary openings that are directed perpendicular to the plane of the underlay, and cross the underlay at points positioned between the common and individual electrodes with criss-crossing parallel rows of orifices arranged. Then feeder channels, through which communication is established with inlet orifices, are made.

The above method is inadequate because it gives no chance to make a head capable of rendering simultaneous supply of ink to the adjacent orifices.

DESCRIPTION OF THE INVENTION

The inventors have performed the task of creating such a method and head for multicolor jet printing by color subtraction and also such a mode of making the jet print head that would provide higher quality and quantity of multicolor printing by propelling ink onto the information carrier through the orifices combined in groups, owing to simultaneous supply of ink to orifices of every group selected for printing.

The task is accomplished as follows: in performing the method of multicolor jet printing, setting the information carrier opposite the group array of jet orifices made according to the number of print colors, and forming elements of the image on the information carrier by subtraction of colors by way of propelling ink onto the information carrier through the group orifices selected for printing, onto the zone of each element of the image, the advantage is taken of the matrix having a plurality of the above-mentioned groups of orifices arranged in criss-crossing parallel rows, while the information carrier is stationary in relation to the matrix, and ink is propelled simultaneously through the orifices of each group selected for printing.

This method affords exact adjustment of colors in every element of the image throughout the whole of the image space, since in the process of printing, the orifices supplying different color fluids (ink) to every group, as well as the information carrier, are stationary in relation to each other. This facilitates higher productiveness owing to simultaneous application of ink throughout the whole of the image space.

The above task is also accomplished by a jet print head comprising a multilaminate structure, an underlay, criss-crossing parallel rows of ink orifices in the shape of capillary openings directed perpendicular to the plane of the underlay, each opening having an electrode that is common for the given row of orifices, and on the same plane, an individual electrode of opposite polarity, also comprising, in the separate layers of the multilaminate structure a switch-on-current system to energize the electrodes, and the system of ink supply with feeder channels communicating with the inlet orifices. The invention allows one to obtain the multilaminate structure with additional layers of the underlay according to the number of ink colors. Here the orifices are divided into groups of adjoining orifices, and their number in each group is equal to the number of ink colors. The inlet openings of all orifices, meant for applying one and the same ink color in all groups, are placed on the respective additional layer of the underlay, while the feeder channels are made in each additional layer of the underlay and intersect with the inlet orifices present in that layer.

Such accomplishment of the multicolor jet print head affords simultaneous supply of ink of every color to the respective orifices in each group of, say, four orifices for printing by subtraction of colors.

The exactness of adjustment of colors is achieved since the points of applying different colors are fixed in relation to each other, and also to the information carrier, and depend not on the external factors.

The task set is also achieved as follows: proceeding from the mode of manufacturing the jet print head that is obtained by creating on the underlay the common and individual electrodes, the multilaminate structure of dielectric layers with a switch-on-current system for the common and individual electrodes, also by arranging the orifices by means of capillary openings (tubes) directed perpendicular to the plane of the underlay of capillary openings that cross the underlay at the points between the common and individual electrodes, with arrangement of criss-crossing parallel rows of ink orifices, and also by making the feeder channels communicating with inlet orifices, the invention allows to place and adjust, on the side of the underlay, the additional layers of the underlay according to the number of print colors, those additional layers being capable of exact adjustment with the underlay. Here the location points of the ink orifices are divided into groups of adjacent points, where the number of points in each group is equal to the number of print colors. The capillary openings are made to pass through that point of each group which corresponds to a single print color. The last of the additional layers of the underlay is removed. The capillary openings are made to pass through another point of each group corresponding to the next print color. Then, the next additional layer of the underlay is removed, and the same procedure is repeated with the remaining points of each group corresponding to other print colors. When all is done, the additional layers of the underlay are restored in reverse order, and the openings (tubes) of the last additional layer of the underlay are plugged.

This method affords a jet print head construction for multicolor printing with a plurality of orifice groups that contain orifices bearing different names in every group, and are placed at an interval necessary for adjustment of colors by subtraction. The basic feature of the method lies in the possibility to have capillary channels at a very small interval (200 micra) with the help of simple technical operations in punching through the openings.

Before the capillary openings are punched through, the feeder channels are made in each additional layer of the underlay to cross the location points of the piercing capillary openings terminating in the given additional layer, and to form a system of ink supply to the inlet orifices. Additional layers of the underlay can be organized beforehand. The print head can be assembled directly at a single work site when the openings are ready.

On completion of the piercing capillary openings in every additional layer of the underlay and before their final assemblage, the channels are made in every additional layer of the underlay to cross the location points of the piercing capillary openings terminating in the given additional layer of the underlay, and form a system of ink supply to the inlet orifices.

This method may be profitably used if the openings serve as supporting elements in centering the equipment to procure the channels.

SUMMARY OF THE DRAWINGS

Following are the examples of implementation of the invention represented in the drawings of which.

THE BEST OPTIONS TO REALIZE THE METHOD

The proposed method of multicolor jet printing is performed as follows.

Figure 1:
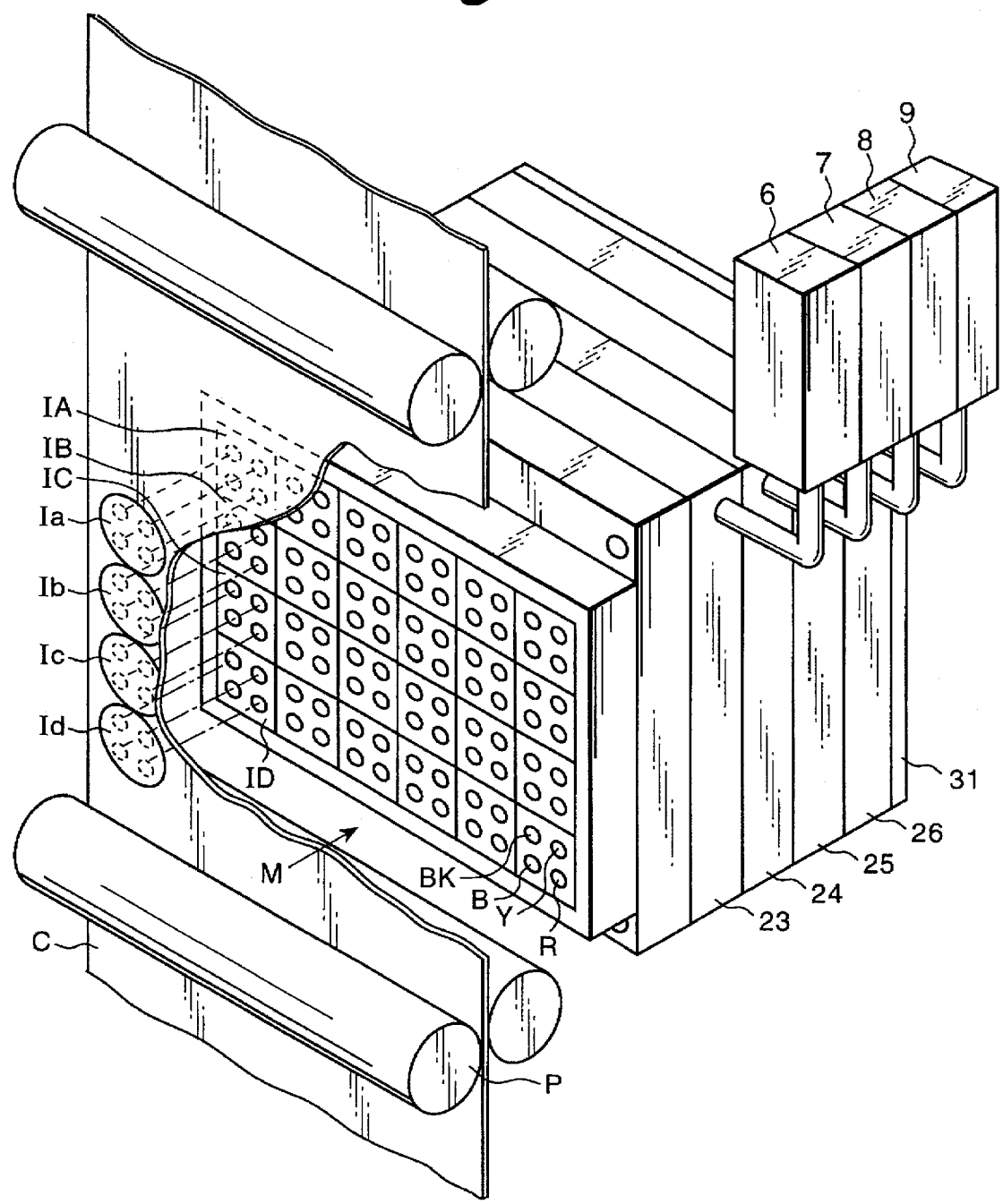
FIG. 1 illustrates the proposed method of multicolor jet printing.

Information carrier C (e.g., a sheet of paper) is placed opposite the orifices BK, Y, R, B corresponding to black, yellow, red and blue ink colors that are normally used for printing by subtraction of colors (FIG. 1). Orifices BK, Y, R, B are positioned on matrix M. Information carrier C and matrix M with ink orifices are stationary in relation to each other. In the printing device, this can be obtained, for example, with the help of the frame that is rigidly attached to matrix M and equipped with clamps (mechanical and vacuum) to anchor the information carrier (not shown in the picture). Obviously, as it is known to specialists, such printing device can accommodate a paper feeding unit. Unit P is also capable of performing the job of making the information carrier stationary.

Jets of black, yellow, red and blue ink are propelled to zones Ia, Ib, Ic and Id of the information carrier C through orifice groups IA, IB, IC and ID. The number of orifices in each group is equal to the number of print colors (four in our instance). Orifice groups IA, IB, IC and ID make criss-crossing parallel rows on matrix M. Delivery of all color fluids (ink) is carried out simultaneously through all orifices selected. Namely, the portions of ink from orifices BK, Y, R and B corresponding to orifice groups IA, IB, IC and ID, come in zones Ia, Ib, Ic and Id of the information carrier C. It is apparent that through some orifices in every group, ink may not ingress, as it is noticeable in the course of multicolor printing by subtraction of colors.

It is clear from the above explanation of the method of multicolor jet printing that the points of all image elements on the information carrier C are simultaneously tinted with colors needed, throughout the whole space of the image, at a fixed position of the information carrier in relation to that of matrix M. By this technique, exact adjustment of colors is achieved, unaffected by extraneous factors. The exact adjustment of colors is acquired by combination of immobility of the carrier with simultaneous printing of all dots of the image elements.

Figure 2:
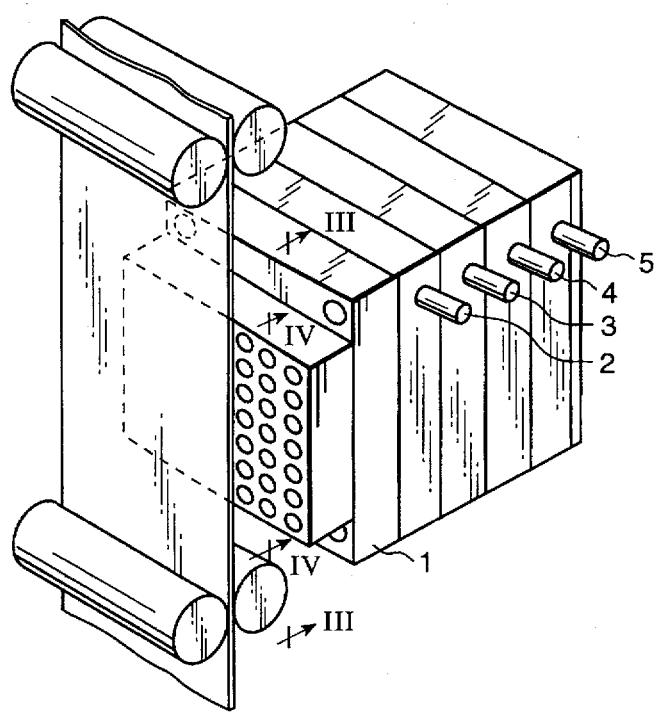
FIG. 2 is a general view of the proposed jet print head to perform the method of multicolor jet printing.

To perform the proposed method of multicolor jet printing, it is necessary to maintain simultaneous supply of ink through orifices selected for printing. This is done with the help of the jet print head shown in FIG. 2.

The proposed jet print head I is equipped with branch pipes 2, 3, 4 and 5 of the ink supply system connected to storages (chambers) 6, 7, 8 and 9 that respectively contain black, yellow, red and blue ink.

Figure 3:
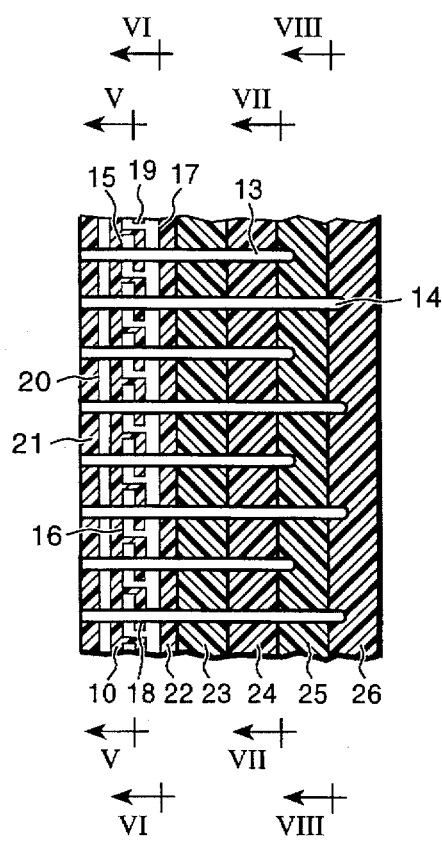
FIG. 3 is a cross-section III—III of FIG. 2.
Figure 4:
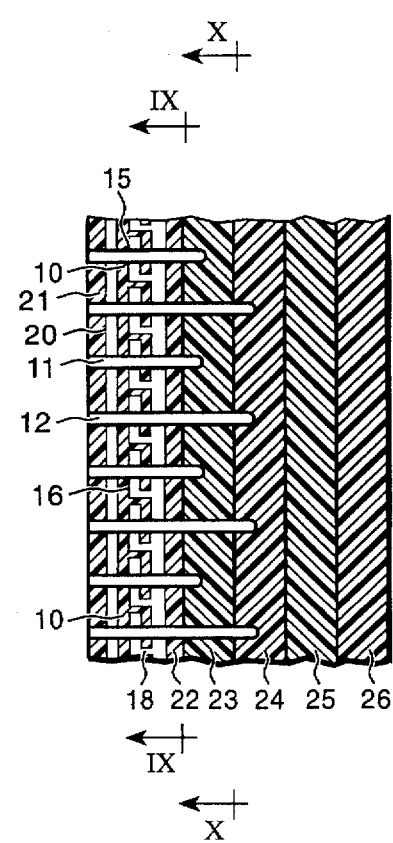
FIG. 4 is a cross-section IV—IV of FIG. 2.

As shown in FIG. 3 and 4, the jet print head I is made in the shape of multilaminate structure comprising the underlay 10, criss-crossing parallel rows of orifices BK, Y, R and B produced in the form of capillary openings 11, 12, 13 and 14 (FIG. 4) directed perpendicular to the plane of the underlay 10. Each orifice, having the pattern of capillary opening, has an electrode 15 that is common for the given row of orifices, and an individual electrode 16 of opposite polarity (FIG. 3–6) staying on the same plane as that of the common electrode 15. Common electrodes 15 are modelled on bars and placed on the inside of the underlay 10. Each opening in these rows has individual electrode 16. The said electrodes 16 remain on the same plane with electrodes 15 that is directed perpendicular to axes of the capillary openings 11–14, but from the opposite side of a single row openings. Thus, all electrodes are placed on one side in the underlay existing on the plane directed perpendicular to axes of orifices and constitute a single layer of multilaminate structure. Electrodes belonging to different rows are electrically isolated in relation to each other. Individual electrodes 16 hold power supply bars 17 that are positioned on the plane parallel to that of electrodes 16 disposition, and are separated from these electrodes by the dielectric layer. The bars are aligned perpendicular to electrodes 15 and each is connected to a singular electrode in different rows of orifices.

Figure 5:
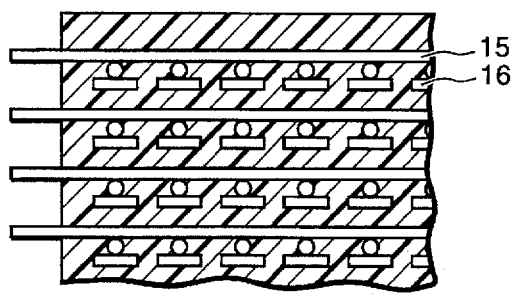
FIG. 5 is a cross-section V—V of FIG. 3.
Figure 6:
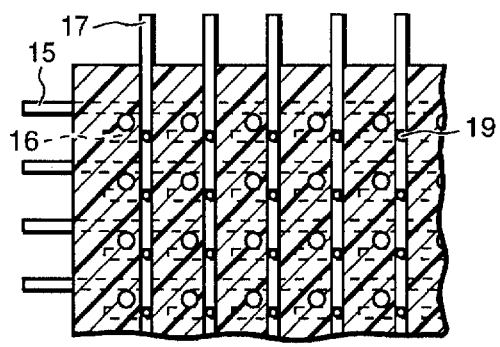
FIG. 6 is a cross-section VI—VI of FIG. 3.
Figure 7:
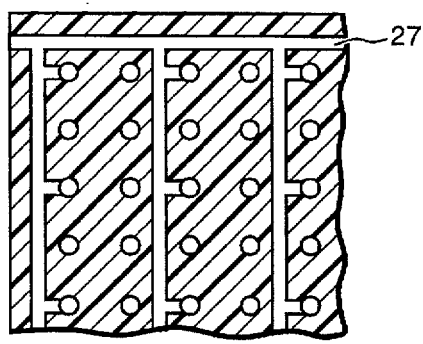
FIG. 7 is a cross-section VII—VII of FIG. 3.
Figure 8:
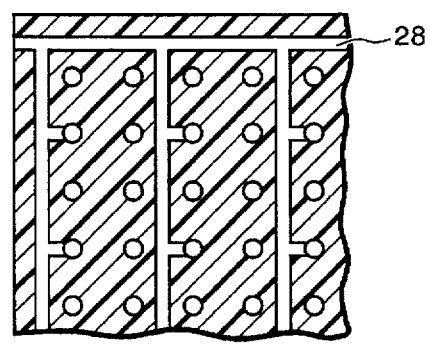
FIG. 8 is a cross-section VIII—VIII of FIG. 3.
Figure 9:
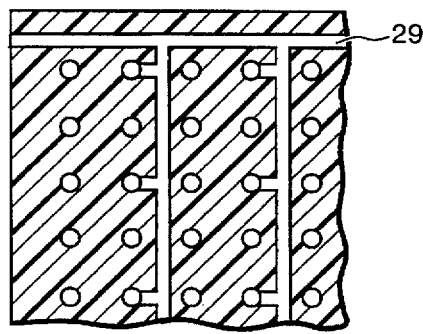
FIG. 9 is a cross-section IX—IX of FIG. 4.
Figure 10:
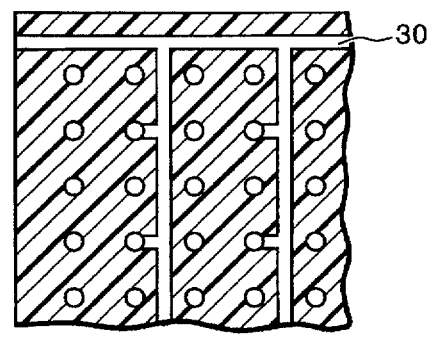
FIG. 10 is a cross-section X—X of FIG. 4.

Therefore, as shown in FIG. 5 and 6, electrodes 15 and electrode bars 16 are positioned on criss-crossing lines and are separated by the layer of dielectric 18.

Crosspieces 19 for bridging individual electrodes 16 and bars 17 pass through dielectric layer 18 parallel to axes of orifices 11–14.

On the outside of the underlay 10 lies magnetic layer 20 protected by coating 21. On the opposite side the multilaminate structure is closed with electricity insulating layer 22.

As shown in FIGS. 3, 4 and 6–10, capillary openings 11–14 of orifices BK, Y, R and B terminate in the respective layers 23–26 of the underlay 10. Each layer 23–26 contains the system of feeder channels 27–30 that are made in the shape of grooves on the surface of the underlay layer to communicate respectively with openings 11–14 and branch pipes 2–6 coupled with ink storages 6–9 (FIG. I). This structure enables simultaneous supply of ink to all orifices in compact disposition. Layer 31 is needed for plugging openings 14.

The above jet head is manufactured as follows.

Figure 11:
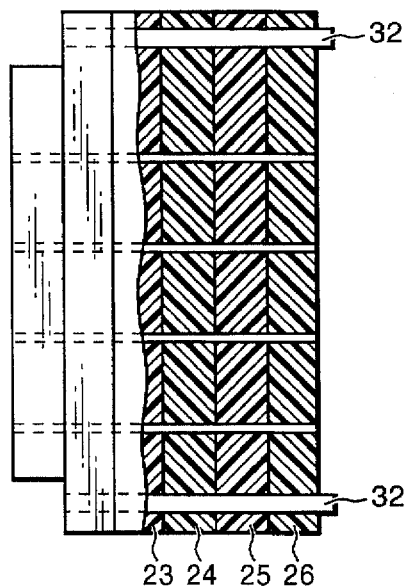
FIGS. 11–15 show the stages of manufacturing the jet print head.
Figure 12:
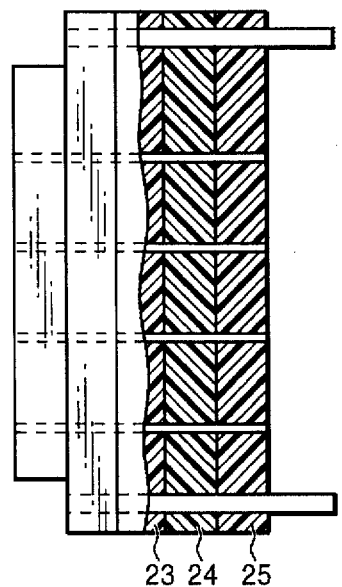
Figure 13:
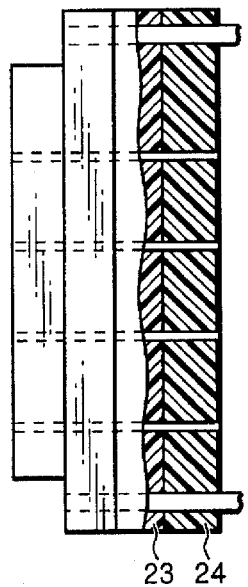
Figure 14:
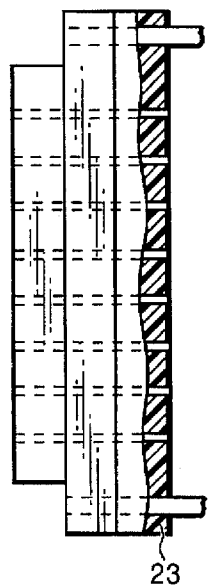
Figure 15:
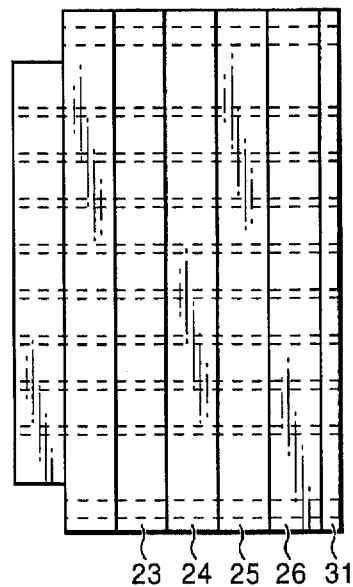

On the one side of the underlay 10 made of dielectric material, by any conventional procedure, continuous stripes of electricity conductive material are placed, effecting electrodes 15 and intermissive stripes 16 that constitute individual electrodes. Distance between the continuous and intermissive stripes is somewhat smaller than the diameter of capillary openings 11–14. The structural layer thus obtained is covered by electricity insulating layer 18, on which electricity conductive layer 17 is placed in the shape of continuous stripes directed perpendicular to those stripes that constitute electrodes 15. After this is done, the electricity conductive crosspieces 19 are formed between electrodes 16 and layer stripes 17. The structure obtained is covered by layer 22 of electricity insulating material. On the opposite side of the underlay 10, layer 20 of magnetic material is placed, and this is covered with protective film layer 21. Then the whole package is assembled, that is layers with electrodes 15 and 16, with magnetic layer 20 and electricity conductive bars and, also, all underlay layers, except layer 31. To perform assemblage (by adjustment of layers) any conventional devices can be used, for example, centering sprigs 32 (FIG. 11) and counter openings (unmarked). Grooves and counter projections of layers, special conductors, electronic and optical systems, etc., can also be employed. Then piercing tubes (openings) 14 are made in each group IA, IB, IC and ID of orifices (FIG. 3, 11). The tubes can be made, for example, by laser or by any other method securing tube diameter of about 30 micra arranged at 200–300 micra interval between the openings. Next, layer 26 of the underlay is removed, and the piercing tubes 13 (FIG. 13) in each group IA, IB, IC and ID of orifices are made and so on. Then, layers 23–26 are assembled in reverse order on the very same sprigs 32 with automatic plugging of tubes 11–13 by every subsequent additional layer of the underlay. Layer 31 of the underlay is installed to plug openings 14.

Feeder channels 27–30 (FIGS. 6–10) can be created in layers 23–26 of the underlay 10 beforehand, so that the practical manufacture of the whole unit of multilaminate structure can be carried out, with elements ready, in a single work zone.

On the other hand, while accomplishing channels 27–30 after the tubes 11–14 are made, the said tubes (openings) can be used as supporting elements needed for exact placement of the channels. These options depend on the availability of specific technology and equipment.

After the whole multilaminate structure is assembled, its components are fastened (glue, fill-up, clamps etc.), and feeder channels 27, 28, 29 and 30 (FIG. 6–10) joined to respective branch pipes 2–5 (FIG. 2), as shown in FIGS. 2–10, to maintain connections with ink storages 6–9.

The proposed jet print head meant for performing multicolor printing operates as follows.

The information carrier C (FIGS. 1–2) is stationary in relation to the print head I. When electrical signal pulse is applied to one of the bars 15 and one of the bars 17 (FIGS. 5–6) through conductive ink, the circuit of electrodes of the respective capillary tube 11–14 is closed. A current that flows in this circuit, interacts with the magnetic field created by magnetic layer 20. As a result, an electro-dynamic force is developed, causing a droplet of ink to be emitted from the capillary tube 11–14 onto the information carrier C (FIG. 1). It is clear that electrical signal pulses are applied simultaneously to the selected combinations of electrodes. Since every orifice group IA, IB, IC and ID (FIG. 1) contains four orifices 11, 12, 13 and 14 (FIGS. 3–4) for the four inks: black, yellow, red and blue, depending on the presence of electricity potential on both electrodes of each capillary tube, creating orifices (one, two, three or four), a portion of ink fluid (or fluids) is emitted to one, two, three or four points of each zone Ia, Ib, Ic and Id of the information carrier C (FIG. 1). Thus, all elements of the image are inked simultaneously with the respective ink fluids throughout the whole of the matrix M covered image space of the information carrier C (FIG. 1).

In reality, this operation can be carried out with the help of matrix memory regulation device that is geometrically similar to matrix M having cells, every one of which corresponds to a specific orifice tube 11–14 of each orifice group IA, IB, IC & ID. The same can be executed with the help of microprocessor, computer and other such equipment for applying electric potential to respective electrodes 15 and 16 in order to obtain a previously designed distribution of ink dots tinted on the image elements. We leave out the details regarding these devices widely used in printing trades and computer technology, since they are of no relevance to the subject matter of the invention.

The exact adjustment of colors, regardless of any external factors, is achieved owing to the fact that the information carrier C and the matrix M (FIG. 1) are stationary in relation to each other, and the supply of ink is carried through immovable tubes 11–14 in the matrix M. Furthermore, the proposed device has a very simple construction because it has no travelling parts and complex electric-and-mechanical systems for adjustment of colors.

The structure of the device is quite simple and does not require a complex electronic system to maintain movement of the print head components. Its manufacture is also easy since it includes the known elements of traditional technology of print assembly and other uncomplicated techniques requiring no sophisticated machinery.

The proposed jet print head can be efficiently used in order to substantially raise the quality of multicolor printing, and simplify and make cheaper the equipment used for this purpose.

Industrial Employment

The invention can be employed in polygraphy for multicolor print production, in the manufacture of printing machinery, and printers to operate in conjunction with peripherals of electronic industrial and personal computer. Also, the invention can be implemented in telefax receiving devices.

What is claimed is:

1. A method for manufacturing a jet print head comprising the steps of:
    (a) forming a plurality of common electrodes and a plurality of individual electrodes on one side of a substrate,
    (b) forming, on said substrate, a multilaminate structure of dielectric layers with a current supply system formed therein for said common electrodes and said individual electrodes and a row of additional layers of said substrate next to one another, said additional layers being of an equal number to a number of ink colors,
    (c) marking out, on said substrate between said electrodes, locations of orifices for supplying ink of said ink colors, resulting in a plurality of rows of locations of orifices on parallel lines,
    (d) combining said locations of orifices into a plurality of groups of adjacent locations, each of said groups of adjacent locations containing a number of locations equal to said number of ink colors, each of the adjacent locations corresponding to one of said locations of orifices for supplying ink of one of said ink colors,
    (e) forming orifices, as capillary openings perpendicular to a plane in which said substrate is disposed, in said locations of orifices of all of said groups which are locations of orifices for supplying ink of one of said ink colors, each capillary opening of said capillary openings being cut through the row of said additional layers up to another layer,
    (f) removing an outer layer of said row of said additional layers,
    (g) repeatedly performing the steps (e) and (f) for forming orifices in remaining locations of all said groups corresponding to the location of the orifices for feeding inks of remaining ones of said ink colors and for removing each outer layer,
    (h) forming feeder channels in each of said additional layers, intersecting orifices made in each of said additional layers and forming a system for supplying inks to said orifices made in each of said additional layers, and
    (i) assembling said additional layers with said capillary openings on said substrate in a reverse order and plugging said orifices of said outer layer of said row of said additional layers.

2. A method for manufacturing a jet print head for multicolor jet printing comprising the steps of:
    (a) forming a plurality of common electrodes and a plurality of individual electrodes on one side of a substrate,
    (b) forming, on said substrate, a multilaminate structure of dielectric layers with a current supply system formed therein for said common electrodes and said individual electrodes and a row of additional layers of said substrate next to one another, said additional layers being of equal number to a number of ink colors,
    (c) forming, in each of said additional layers, feeder channels providing a system for supplying inks in which feeder channels made in one of said additional layers are intended to feed ink of one of said ink colors,
    (d) marking out, on said substrate between said electrodes, locations of orifices for supplying ink of said ink colors, resulting in a plurality of rows of locations of orifices in parallel lines,
    (e) combining said locations of orifices into a plurality of groups of adjacent locations of orifices, each of said groups of adjacent locations of orifices containing a number of locations of orifices equal to said number of ink colors, each of the orifice locations being for supplying ink of one of said ink colors,
    (f) forming orifices, as capillary openings perpendicular to a plane in which said substrate is disposed, in locations of all of said groups corresponding to locations of orifices for supplying ink of one of said ink colors, each said capillary opening being cut through the row of said additional layers up to a last layer to intersect said feeder channels formed in said additional layers,
    (g) removing said last layer,
    (h) repeatedly performing the steps (f) and (g) for forming orifices in remaining locations of all said groups of orifices for feeding inks of remaining colors, and for removing each said last layer,
    (i) assembling said additional layers with said capillary openings on said substrate in a reverse order and plugging said orifices of an outermost layer of said row of additional layers.

3. A method for multicolor jet printing comprising the steps of:
    positioning an information carrier, intended to receive image elements thereon, opposite to a matrix having a plurality of jet orifices spaced one from another and adapted to apply ink jets onto said information carrier, said information carrier and said matrix being stationary with respect to each other,
    forming, from said plurality of jet orifices, groups of said orifices arranged on said matrix along parallel lines, each of said groups of said orifices having orifices in a number equal to a number of ink colors used for the multicolor printing, said orifices in each of said groups being closely spaced adjacent each other,
    selecting, from said groups of orifices, a row of said groups arranged on said matrix opposite to areas on said information carrier on which an image is to be applied, and
    simultaneously feeding said ink jets through said groups of orifices selected and through all orifices of said groups of orifices selected, whereby ink from ink jets of each of said groups of orifices forms a point of ink of each of said ink colors which together appear to be substantially of a single color, wherein each of said groups of orifices comprises four jet orifices disposed in a square arrangement, each of said jet orifices in each of said groups ejecting ink of a different color.

4. A jet print head for multicolor jet printing comprising:

an ink supply system for supplying ink for multicolor printing, a row of ink sources for supplying said supply system, each source of said row of ink sources supplying one of a plurality of ink colors, a substrate comprising a main layer and a group of layers, wherein each layer of said group of layers receives ink of one of said plurality of ink colors from one source of said row of ink sources, a row of feeder channels of said supply system, each channel of said row of feeder channels being connected to one of said ink sources and being located in one of said layers of said substrate for feeding an ink color of said plurality of ink colors intended for said layer, a plurality of capillary orifices combined into capillary orifice groups, said capillary orifice groups being arranged on a plurality of parallel rows perpendicular to a plane in which said substrate is located, each capillary orifice of said plurality of capillary orifices having a geometric axis and intended to apply ink of one color, inlets of said capillary orifices intended to apply the ink of one color in all said groups arranged in one layer of said group of layers in accordance with the ink color intended for said layer connected to each of said feeder channels arranged in said one of said layers of said substrate, first electrodes of one polarity, each of said first electrodes being associated with one of said plurality of rows and being common for the orifices of said one of said plurality of rows, second electrodes of polarity opposite to that of said first electrodes, each of said second electrodes being associated with one of said capillary orifices, said first electrodes and said second electrodes being located in one plane perpendicular to geometric axes of said capillary orifices, and a system for supplying electric current connected to said first electrodes and connected to said second electrodes and located in a plane parallel to said one plane, whereby ink jets of each group of orifices form points of ink of each color which together appear to be substantially of a single color, wherein each of said capillary orifice groups comprises four capillary orifices disposed in a square arrangement.

* * * * *